Patented July 24, 1951

2,561,899

UNITED STATES PATENT OFFICE 2,561,899

DITHIENYL ALLYL AMINES

Donald Wallace Adamson, London, England, assignor to Burroughs Wellcome & Co. (U. S. A.) Inc., Tuckahoe, N. Y., a corporation of New York No Drawing. Application July 14, 1949, Serial No. 104,810. In Great Britain February 25, 1948

6 Claims. (Cl. 260—293.4)

The present invention deals with a family of gamma, gamma-dithienyl allyl amines, the members of which possess outstanding analgesic properties comparable to those of morphine and the leading synthetic equivalents thereof.

These substances can be represented by the formula

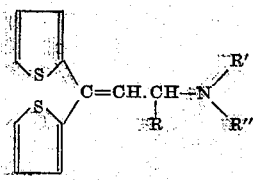

wherein R is a radical selected from the class consisting of the methyl radical and hydrogen; R' and R'' are radicals selected from the class consisting of alkyl radicals containing together not over 4 carbon atoms and

may be a heterocyclic radical of the class consisting of the N-piperidino, and the N-pyrrolidino radicals.

The new derivatives may be used either in the form of the base or a water-soluble salt thereof such as the hydrochloride. The non-toxic acid used to form the salt is immaterial insofar as the physiological activity of the substances is concerned and is not of a critical nature. Hydrochloric acid, hydrobromic acid, sulfuric acid, phosphoric acid or certain organic acids such as malic acid, succinic acid, lactic acid or the like may be employed and any of these may offer advantages in individual cases. All non-toxic acids are considered to be equivalent for this purpose and all salts thereof are comprehended within the invention.

In a companion application the preparation of new dithienyl amino alcohols is described in a series of steps which involve contacting a 2-thienyl lithium or 2-thienyl magnesium halide with a selected ester whereby a metal alcoholate of the desired dithienyl amino alcohol is formed. The metal alcoholate may be then hydrolyzed with water to give the corresponding dithienyl amino alcohol which in the majority of cases separates as a sparingly soluble salt of the basic product.

The new derivatives are most conveniently prepared by the dehydration of the corresponding tertiary alcohols produced by the foregoing procedure in accordance with the following equation:

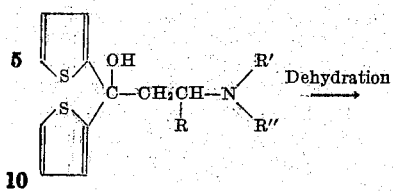 Dehydration

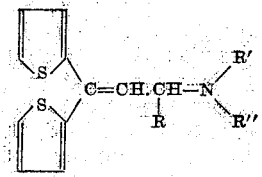

wherein R, R' and R'' have the above indicated value. A variety of methods may be utilized for the dehydration of the dithienyl amino alcohols to produce the corresponding unsaturated derivatives of the present invention. One of the preferred methods is performed by reacting the dithienyl amino alcohol with a suitable agent commonly employed in dehydrating tertiary alcohols such as the various mineral acids, carboxylic acid chlorides and carboxylic acid anhydrides.

It has been found satisfactory to dissolve the dithienyl amino alcohol or a salt thereof in aqueous hydrochloric acid and then warm the solution on a steam bath for about 15 minutes. The solution is then evaporated under reduced pressure and allowed to cool when, in some cases, the hydrochloride of the substituted dithienyl allyl amine crystallizes out and may be removed by filtration. In other instances the evaporation must be continued to dryness under a reduced pressure and the residue dissolved or suspended in water whereupon an excess of alkali such as concentrated ammonia is added to the solution and the liberated base separated by extraction with a suitable solvent such as ether or chloroform. The base may then be recovered by evaporation of the solvent and purified by distillation under a reduced pressure.

Alternatively, dehydration may be effected by passing excess dry hydrogen chloride into a solution of the dithienyl amino alcohol in an organic solvent such as chloroform or ethanol and then warming the solution over a steam bath. The solvent may then be removed by evaporation and the hydrochloride of the residual dithienyl allyl amine recrystallized from a suitable solvent.

The following examples illustratively show specific procedures for the preparation of the new derivatives in accordance with the invention:

*Example 1*

A solution of ethyl-β-N-piperidinopropionate (Hromatka, Berichte, 1942, volume 75, page 131) (37 grams) in anhydrous ether (50 c. c.) is added gradually to an ether solution of the Grignard reagent made from 2-bromothiophene (97.8 grams) and magnesium (14.6 g.), stirred and cooled to 0° C. After heating under reflux for 8 hours, the mixture is cooled and stirred into crushed ice (100 g.). Acetic acid is then added gradually to the stirred mixture, cooled to 0° C., until the mixture is acidic to litmus. After stirring for a further 30 minutes the salt which separates is removed by filtration and washed with ether. The salt is then dissolved in chloroform, shaken with excess ammonia solution and the chloroform layer separated, washed with water, dried by the addition of anhydrous sodium sulphate and the chloroform evaporated. Fractional distillation under reduced pressure of the liquid residue yields two main fractions; the one having boiling point 105°/0.04 millimeter is beta-piperidinopropiothienone, and the other, having boiling point 176–180° at 0.04 mm. is 3-N-piperidino -1:1- di -(2'-thienyl)- propan-1-ol, which, after recrystallization from ethanol or light petroleum, has melting point 70–72° C.

5 g. of the 3 - N - piperidino - 1:1 - di(2'-thienyl)-propan-1-ol, prepared in this manner, is dissolved in 50 cubic centimeters of 6 Normal hydrochloric acid and the solution heated on the steam bath for 15 minutes. Decolorizing charcoal is then added, the heating continued for a further 5 minutes and the hot solution filtered. On cooling the filtrate, 3-N-piperidino-1:1-di(2'-thienyl)-prop-1-ene hydrochloride separates as a hydrated salt having a melting point of 124–130° C. which, on drying and recrystallizing from a mixture of ethanol and ethyl acetate, melts with decomposition at 171–173° C. The base obtained by basifying a solution of the hydrochloride is a colorless oil, rapidly becoming colored on exposure to air, of boiling point 143° C. at 0.04 mm.

*Example 2*

Excess dry hydrogen chloride is passed into a solution of 3 - dimethylamino - 1:1 - di(2'-thienyl)butan-1-ol (8.5 g.) in chloroform (35 c. c.), without cooling. Chloroform is then removed by evaporation and the residue dissolved in boiling ethanol (50 c. c.). Decolorizing charcoal is then added, the boiling continued for 5 minutes and the hot solution filtered, concentrated and hot ethyl acetate (50 c. c.) added. 3 - dimethylamino - 1:1 - di(2' - thienyl)but-1-ene hydrochloride, which crystallizes on cooling, is recrystallized from a mixture of ethyl acetate and ethanol when it has a melting point of 168–169° C. The base is obtained as a viscous oil by dissolving the hydrochloride in water, adding excess ammonia solution and extracting with chloroform.

By the same method, 3 - methylethylamino-1:1 - di - (2' - thienyl) - but - 1 - ene and 3 - methylpropylamino - 1:1 - di - (2' - thienyl) - but-1-ene may be prepared from the corresponding dithienyl amino alcohols.

*Example 3*

3 - dimethylamino - 1:1 - di(2' - thienyl)prop-1-ene was prepared by dissolving 10 g. of 3-dimethylamino - 1:1 - di(2' - thienyl) - propan-1-ol in a mixture of 100 ml. of acetic acid and 30 ml. of concentrated aqueous hydrochloric acid and boiling the solution under reflux for 15 minutes. When cooled and basified the 3-dimethylamino - 1:1 - di(2' - thienyl)prop - 1 - ene separated from the solution, was extracted with ether and purified by distillation under reduced pressure. The product had a boiling point of 91–94° C. at 0.05 mm. In the form of the hydrochloride the product had a melting point of 142–143° C. when recrystallized from a mixture of ethanol and ethyl acetate.

*Example 4*

3 - diethylamino - 1:1 - di - (2' - thienyl) - prop-1-ene is formed by dehydrating 3-diethylamino - 1:1 - di(2' - thienyl) - propan - 1 - ol by the method of Example 3 and converted to the hydrochloride which on recrystallization from ethanol and ethyl acetate had a melting point of 116–117° C.

*Example 5*

3 - N - pyrrolidino - 1:1 - di - (2' - thienyl) - prop-1-ene is formed by dehydrating 3-N-pyrrolidino - 1:1 - di(2' - thienyl) - propan - 1 - ol by the method described in Example 2 and converted to the hydrochloride which had a melting point of 102–103° C.

By the same method 3 - N - pyrrolidino-1:1 - di - (2' - thienyl) - but - 1 - ene, is prepared from the corresponding dithienyl amino alcohol.

*Example 6*

10 g. of 3 - N - piperidino - 1:1 - di(2'-thienyl)-butan-1-ol is dissolved in a mixture of 100 ml. of acetic acid and 30 ml. of concentrated aqueous hydrochloric acid and the solution warmed on the steam-bath for 5 minutes. The product when recovered by the method of Example 3 gave 3-N-piperidino-1:1-di(2'-thienyl)-but-1-ene having a boiling point of 132–136° C. at 0.05 mm. In the form of the hydrochloride, upon recrystallization from a mixture of ethanol and ethyl acetate, the product had a melting point of 188–189° C. with decomposition.

*Example 8*

By a similar method to that employed in Example 2 3-diethylamino-1:1-di(2'-thienyl)but-1-ene was prepared having a boiling point of 104–106° C. at 0.1 mm. pressure. The hydrochloride of this compound was formed having a melting point of 121–122° C.

I claim:

1. Dithienyl allyl amines of the type represented by the formula

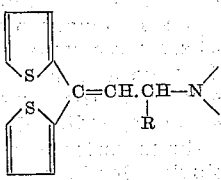

wherein R is a radical selected from the class consisting of the methyl radical and hydrogen, the radical

is selected from the class consisting of

having not over 4 carbon atoms in the alkyl groups, -N-piperidino and -N-pyrrolidino radicals and the water soluble salts of these with non-toxic acids.

2. As new compounds 3-dimethylamino-1:1-di-(2'-thienyl) but-1-ene and the water soluble salts thereof with non-toxic acids.

3. As new compounds 3-N-pyrrolidino-1:1-di-(2'-thienyl)-prop-1-ene and the water soluble salts thereof with non-toxic acids.

4. As new compounds 3-N-piperidino-1:1-di-(2'-thienyl)-but-1-ene and the water soluble salts thereof with non-toxic acids.

5. As new compounds 3-methylpropylamino-1:1-di-(2'-thienyl)-but-1-ene and the water soluble salts thereof with non-toxic acids.

6. As new compounds 3-methylethylamino-1:1-di-(2'thienyl)-but-1-ene and the water soluble salts thereof with non-toxic acids.

DONALD WALLACE ADAMSON.

REFERENCES CITED

The following references are of record in the file of this patent:

UNITED STATES PATENTS

| Number | Name | Date |
|---|---|---|
| 2,367,702 | Van Zoeren | Jan. 23, 1945 |
| 2,406,594 | Djerassi | Aug. 27, 1946 |
| 2,409,287 | Kharasch | Oct. 15, 1946 |

FOREIGN PATENTS

| Number | Country | Date |
|---|---|---|
| 883,539 | France | Mar. 29, 1943 |

OTHER REFERENCES

Whitmore, "Organic Chemistry," page 893, Van Nostrand, N. Y., 1937.

Richter, "Organic Chemistry," pages 649-650, Wiley, N. Y., 1938.